Dec. 15, 1970    T. O. PAINE, DEPUTY    3,547,801
ADMINISTRATOR OF THE NATIONAL AERONAUTICS
AND SPACE ADMINISTRATION
WATER MANAGEMENT SYSTEM AND AN ELECTROLYTIC CELL THEREFOR
Filed Aug. 8, 1968    2 Sheets-Sheet 1

Charles F. Albright
Joseph B. Gillerman
INVENTORS

BY
Russell E. Schlott
ATTORNEY

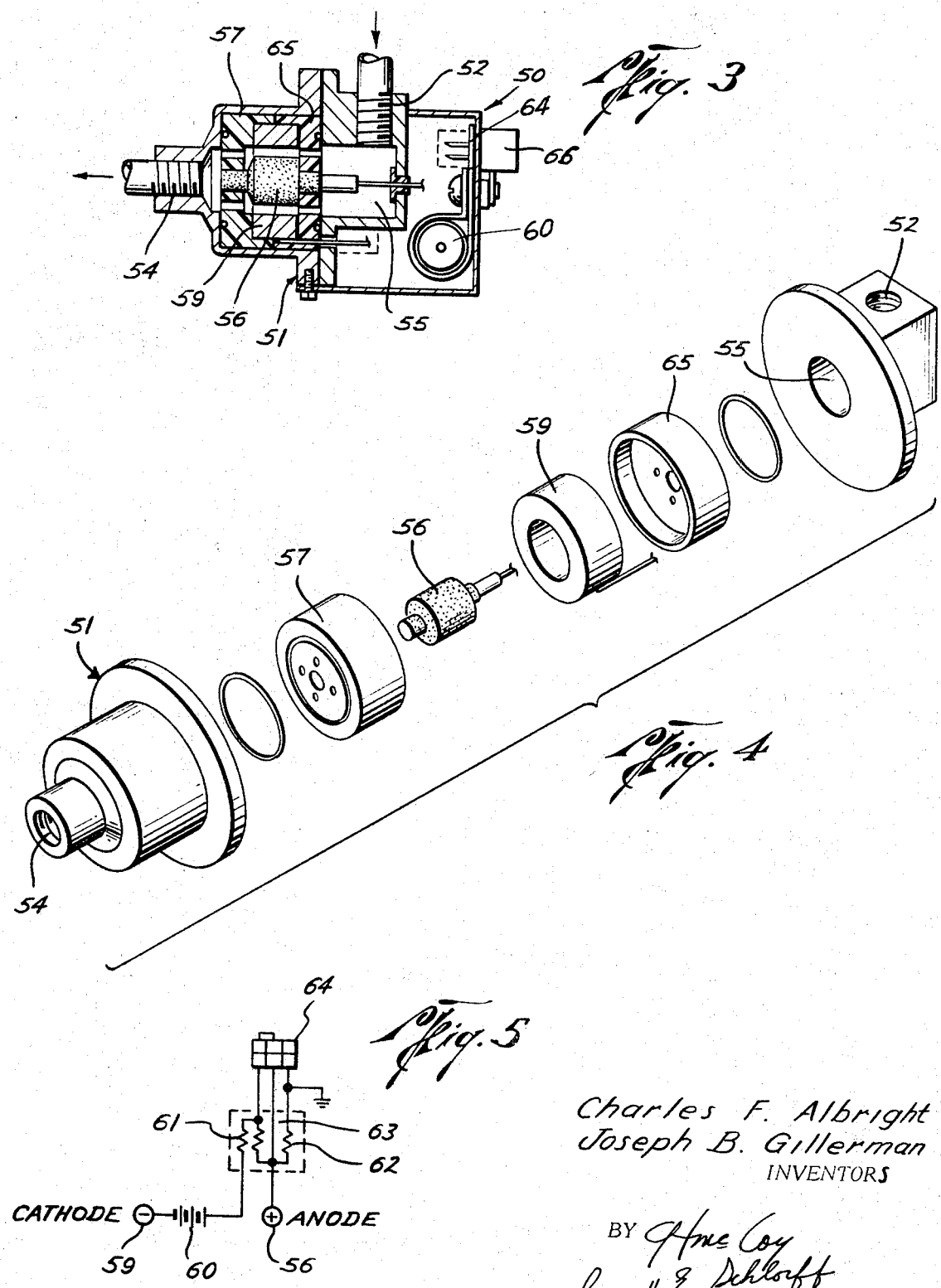

United States Patent Office 3,547,801
Patented Dec. 15, 1970

3,547,801
WATER MANAGEMENT SYSTEM AND AN ELECTROLYTIC CELL THEREFOR
T. O. Paine, Deputy Administrator of the National Aeronautics and Space Administration, with respect to an invention of Charles F. Albright, Torrance, and Joseph B. Gillerman, Los Angeles, Calif.
Filed Aug. 8, 1968, Ser. No. 751,198
Int. Cl. B01k 1/00
U.S. Cl. 204—305                                10 Claims

ABSTRACT OF THE DISCLOSURE

A water management system formed of a waste water system which interfaces with a potable water system so that potable water is available in emergency situations. There is a normally long residence time in each system. An electrolytic cell is formed of a housing having an inlet and an outlet with a silver anode surrounded by a silver cathode located in the fluid flow path. An electrical control system consisting of a battery and resistors limits the current to achieve the proper concentration of silver ions for bactericidal control without creating a health hazard.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a water sterilization system and more particularly to a water system having an electrolytic cell producing silver ions for bactericidal control.

BACKGROUND OF THE INVENTION

In any water system where the water has a long residence time, it is most desirable to have an effective means of bactericidal control. Without such control, microbial growth and multiplication may result in plugged filters as well as contamination of potable water.

Although the system will be described in relation to an aerospace application, it is to be understood that it can be used equally well for purification of relatively small amounts of drinking water in many other applications, particularly where there is a long residence time. Although ordinarily it is most desirable that a potable water system be completely isolated from a waste water system so that there is no possibility of microbial contamination of the potable water system, in a spacecraft where weight control is critical and full utilization of all water for emergency situations is essential, the interfacing of the two systems may be desirable if proper bactericidal methods can be utilized.

Even though fuel cell water in a spacecraft such as the Apollo is microbe free, contamination still may occur. For example, during manufacture and assembly, microorganisms are deposited on internal and external surfaces of equipment resulting in initial microbial contamination. Moreover, if there is an interface with a waste water system, it is almost virtually impossible to fully eliminate some migration into the potable water system since microorganisms are very minute. Accordingly, it is desirable that some means be provided to sterilize the water stored in both systems. Many techniques—heat, radioactivity, chemical processing, and oligodynamic effects were investigated. A microbial contaminant control process should satisfy the following: control and kill microbial contaminants; have a residual bactericidal effect downstream of the process; maintain bactericide concentration at accepted levels; require no additional power; and require no additional equipment or expendable supplies. Hence, it was decided that the metal ion method of bactericidal control (oligodynamic effect) would be most efficient, particularly in view of the long residence time.

In order to utilize oligodynamy it was necessary to provide some means of generating silver-ions so that they would remain in the water to provide microbial contaminant control throughout the system. Since the silver ions would be ingested, it was necessary to control the generation rate to yield a concentration level below or equal to the Public Health Service maximum, i.e., 50–100 p.p.b. (0.5–1 microgram per gram maximum). At this concentration level many types of bacteria are not killed instantly, and some residence time is required in the system to achieve sterilization. However, since the residence time was determined to be approximately 50 hours, which is several times longer than necessary to reduce bacteria count to very low numbers, the low concentration level was not considered determinable.

Accordingly, it is an object of the present invention to provide a water management system which will control and kill microbial contaminants and maintain the bactericidal concentration at accepted levels.

Another object is to provide an ion generator capable of generating a small amount of silver ions (50–100 p.p.b.) in a continuous flowing stream of essentially distilled water to provide purification and disinfection of the water.

Still another object is to provide a means for electrolytic generation of metal ions in a continuous flowing stream.

A further object is to provide a self-contained electrolytic cell requiring no external power or control for generation of metal ions, the cell providing very accurate control of quantity of metal-ions produced and the rate of introduction.

A still further object is to provide an electrolytic cell to control the amount and rate of introduction or removal of trace elements in a flowing fluid stream.

SUMMARY

These and other objects of the invention which will become apparent from the detailed description which follows are accomplished by providing a water management system formed of a potable water system which interfaces with a waste water system and wherein the water has a long residence time with a means of generating and introducing into the system a controlled amount of bactericidal ions. The means for generating and metering the metal ions into the relatively constant flow is formed of a housing containing a centrally located, isolated silver anode surrounded by a silver cathode. The housing has an inlet and outlet which direct fluid past the anode. The electrical control system consists of a battery and resistor which limits the current. The silver ions are released at a rate proportional to the current flow according to Faraday's law.

Other objects and many of the attendant advantages of this invention will be readily appreciated by reference to the following detailed description when considered in connection with the accompanying drawings in which like reference numerals designate like parts throughout the figures thereof and wherein:

DESCRIPTION OF THE DRAWINGS

FIG. 3 is a cross-sectional view of the silver ionization cell utilized in FIG. 1.

FIG. 4 is an exploded view of the cell shown in FIG. 3.

FIG. 5 is a schematic of the electrical control circuit for the cell shown in FIG. 3.

DESCRIPTION OF THE SPECIFIC EMBODIMENTS

Figure 1:
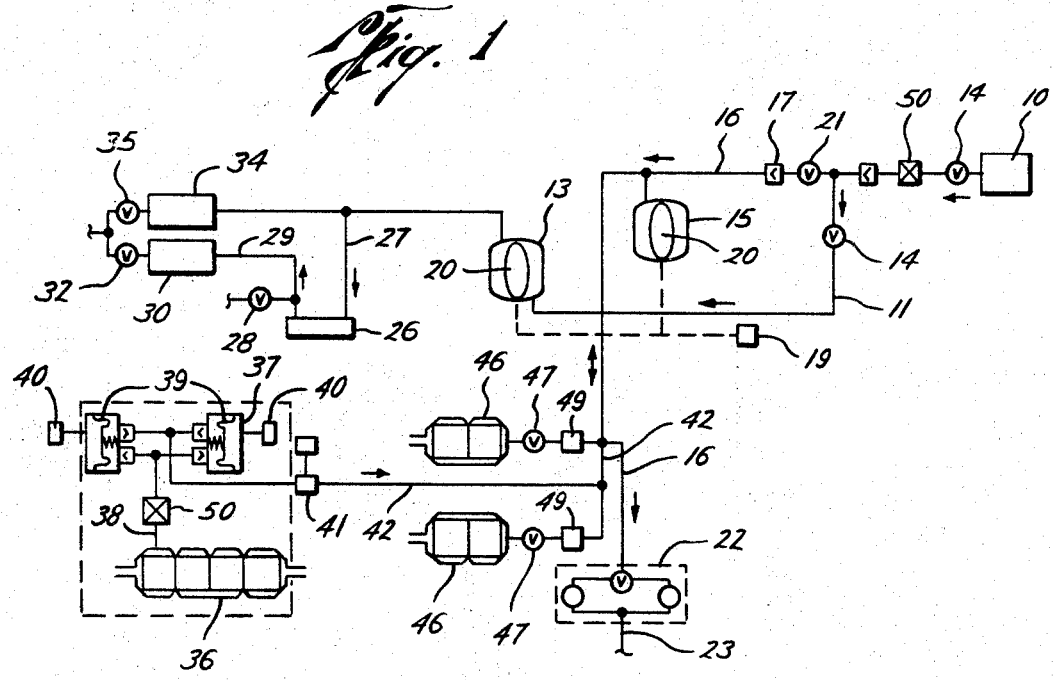
FIG. 1 is a schematic of a water management system for a spacecraft constructed in accordance with the present invention.

Referring now to the drawings and particularly FIG. 1, it can be seen that the water management system is formed of a potable water system and an interfacing waste water system.

A fuel cell 10 produces microbe-free water for the potable water system in a high pH elevated temperature and environment from cryogenically stored, high purity reactants. The water produced by the fuel cell is transmitted through fluid transmission line 11 to a potable water storage tank 13. Manual shut-off valves 14 may be incorporated at appropriate locations in transmission line 11.

The waste water system has a waste water storage tank 15 connected to a fluid transmission line 16 which interfaces with fluid transmission line 11 of the potable water system at a one-way check valve 17. When potable water tank 13 and waste water tank 15 are partially full, water flows from fuel cell 10 through fluid transmission line 11 directly to the potable water tank where it is stored at 25 p.s.i.a. A tank pressure control valve 19 applies pneumatic pressure to bladders 20 within the storage tanks. When potable water storage tank 13 is full, the increase in tank pressure is sensed by a pressure relief valve 21 located adjacent to check valve 17. On a predetermined pressure differential (i.e., 3 p.s.i.) pressure relief valve 21 opens and allows water to be diverted to the waste water system. Pressure relief valve 21 may include a manual valve to permit override of a failed open relief valve 21. When both storage tanks are full, the pressure in systems increases until a water pressure relief valve 22 in transmission line 16 which may have a setting of 32 to 40 p.s.i. opens. When this occurs, excess water is exhausted overboard through a vacuum duct 23. As mentioned, check valve 17 isolates the potable water system from the waste water system and prevents backflow of waste water into the potable water supply.

Potable water is supplied to the crew at three temperatures: (1) at a temperature range of 35° to 50° F.; (2) at a temperature of 154° F; and (3) a storage temperature directly from the storage tank. Cold water supply is provided by a water chiller 26 which is attached to the potable water storage tank by transmission line 27. The water chiller, which cools the potable water by heat exchange with a thermal loop coolant, may have a capacity of .5 lb. Cold water from the chiller is available to the crew by a water shut-off valve 28 connected to fluid transmission line 29 which also delivers water to a water tank 30 in potable water supply assembly which has attached thereto a water selector valve 32. Potable water from storage tank 13 is also delivered via line 27 to a heater tank 34 which may have a capacity of 1.19 lbs. and which heats the water to a temperature of 154° F. Hot water is available for consumption through a water selector valve 35.

Water shut-off valve 28 is located downstream of the potable water tank and may be used to charge water management system prior to launch, recharge the potable water storage vessels while in orbit, and satisfy any other potable water requirements. Total water residence time in the potable water system is approximately 50 hours, based on the volume of the potable water storage tank, water heater, water chiller, 20 feet of ¼ inch O.D., .035 inch wall tubing, and a water consumption rate of 6.16 lbs. per man per day for three men. Residence time in the potable water tank is 46.6 hours. These values are based on a continuous flow (5.8 ml./min.), therefore are average numbers. Flow will be intermittent and perhaps as high as 300 ml./min. for a few seconds. While in a large storage tank such intermittent flow would have no effect on the average residence time; in a small flow, water sterilization process, this high intermittent flow must be considered.

In the waste water system, a space suit heat exchanger assembly 36 collects humidity condensate and discharges it into cyclic accumulators 37 through fluid transmission line 38. Water is drawn into the accumulator by expansion of a spring lever diaphragm 39. A 100 p.s.i. oxygen source 40 is used to depress the diaphragm and pump the condensate into the water waste system. The cyclic accumulator control determines the cyclic rate of the accumulator (approximately 140 ml. in 10 sec. at 10 min. intervals). An oxygen warning sensor 41 may be used to detect the presence of free gaseous bubbles in the waste water stream flowing in accumulator outlet line 42. The sensor is used to detect a leak in accumulator bellows 39.

The waste water supply system can be used to supply emergency cooling through evaporators 46 which may be used for cooling purposes during peak loads. Evaporators 46 are connected to accumulator outlet line 42 which connects with transmission line 16. On demand, evaporator water control valves 47 will open and water will flow from cyclic accumulators 37 and/or the waste water tank 15 to evaporators 46. A filter 47 is located in line 42 upstream of evaporator water control valves 47. If insufficient water has been collected by the cyclic accumulator, and if the demand on the water waste tank is greater than it can supply, water from the potable supply system will flow to the evaporator waste control valves via pressure relief valve 17 once the set differential pressure is achieved. Accordingly, it can be seen that an interfacing between the waste water system and the potable water system is desirable.

As previously mentioned, during the manufacturing and assembly process, microorganisms will be deposited on internal as well as external surfaces of the equipment, resulting in initial microbe contamination throughout the system. Also, condensate from the environmental control system will be highly contaminated. If bactericidal methods are not employed, microbial contamination throughout the entire waste water system is possible. Microbial contaminants collected in suit heat exchanger 36 will spread throughout the waste water system by backflow diffusion and natural bacterial migration. The contamination level will be highest in the suit heat exchanger, and lowest at the most distant point. It will depend upon the amount of nutriment available.

Microbial contamination of the potable water system may occur from the following sources: (1) microorganisms deposited and entrapped during the assembly, (2) the personnel/system interface (i.e., where the personnel utilize the system for drinking or food preparation), and (3) waste water/potable water interface at check valve 17. This last mode of contamination may occur in several ways and result in different levels of contamination. When forward flow through check valve 17 occurs, minor contamination may result due to microbial diffusion against the directional flow. Unless seating of check valve 17 is absolute, migration to the potable water side is also possible. Since bacterial are approximately one micron in diameter, this mode of contamination is a distinct possibility. Additionally, failure of check valve will cause backflow into the potable water system and lead to the highest level of contamination. Accordingly, it can be seen that disinfection of both the waste water and potable water systems is necessary. Because the microorganisms are particulate, they may plug filters and other porous media. Microbial growth and multiplication will increase the effect. While disinfection of the waste water system is not necessary for crew safety, contamination should be reduced to a low level, and growth inhibited to protect equipment and minimize contamination of the potable water supply. The potable water requirements, of course, are more stringent, and disinfection is a necessity. As previously mentioned, it has been discovered that oligodynamy is an effective method of sterilizing the water system. Accordingly, both waste water system and the potable water are provided with an electrolytic silver-ion cell 50. The electrolytic cell for the potable water system is located in line 11 just downstream of fuel cell 10. Accordingly, the electrolytic cells are located in positions where there will be the greatest likelihood of small continuous flow.

Figure 2:
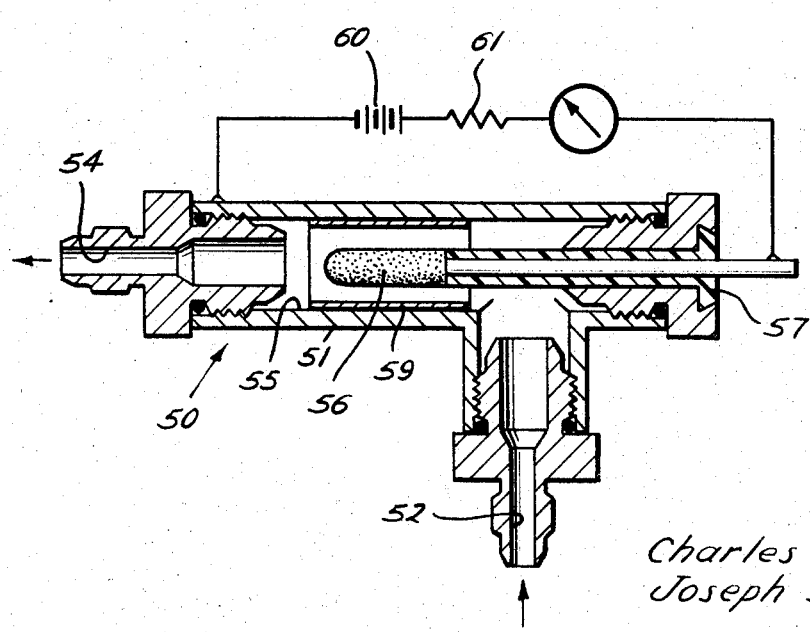
FIG. 2 is a cross-sectional view of a prototype electrolytic silver-ionization cell of the present invention.

As can be seen in FIGS. 2 and 3, each electrolytic cell 50 is formed of a housing 51 having a fluid inlet 52 and fluid outlet 54 which are in fluid communication with a chamber 55. The housing is adapted for connection into the fluid transmission lines of the water systems. Centrally located in chamber 55 is a silver anode 56 which is electrically insulated by insulator 57 which may be a bushing formed of the tetrafluoroethylene. Surrounding anode 56 in spaced relation is a cathode 59 which may be silver plated aluminum sleeve. A source of direct current, which may be a battery 60, has its positive terminal connected to anode 56 and its negative terminal connected to cathode 59. A control resistor 61 is in the line between the positive terminal and the anode. FIG. 2 represents a prototype cell to illustrate the concept, and FIG. 3 represents an electrolytic cell designed for utilization in the water systems shown in FIG. 1. As can be seen, the cell in FIG. 3 has its electronics enclosed in the housing. Also in the cell shown in FIG. 3, the electronic system includes several more resistors (see FIG. 5), the purpose of which will be explained subsequently.

In electrolytic silver ion generation, a potential at low current is applied between the cathode and the anode. Silver ions are released at a rate proportional to the amount of current flow according to Faraday's law (i.e., one gram equivalent of a substance will be formed at an electrode for the passage of a quantity of electricity equal to 96,500 coulombs or 26.8 amp-hours). By regulation of the current flow, the silver ionization rate can be precisely controlled.

As mentioned, the source of potable water in the spacecraft is fuel cell 10. The water flow rate is dependent on vehicle power requirements, but essentially averages 7 cc. per minute. This water can be considered distilled, but saturated with hydrogen. The waste water consists of excess potable water and condensate from suit heat exchangers 36. The condensate flow rate averages between 2 and 4 cc./min. and varies with workload.

When the electrolytic silver ion generator operates in a flowing water stream, the silver ions are removed before deposition can occur at the cathode. The electrode reactions can be written as:

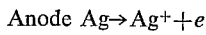
Anode Ag→Ag$^+$+e

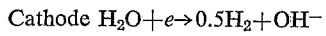
Cathode H$_2$O+e→0.5H$_2$+OH$^-$

Current requirements are low (15 microamperes or less) so that internal resistance of the cell is not controlling although distilled water is relatively nonconductive. Furthermore, the amount of hydrogen produced is negligible so that the cathodic overvoltage is limited. The concentration of ionic silver (50 to 100 p.p.b.) is within the solubility of the silver oxide so that little or no precipitation occurs.

Silver is more noble than other metals, excluding gold and metals of the platinum series; therefore, an anode of high purity is necessary to prevent introducing other metallic ions into the potable water stream.

In the absence of an imposed potential, silver is cathodic to most other metals. If the cathode were other than silver or a more noble metal, a bucking potential would exist between the silver anode and the cathode. Such bucking potential can be eliminated by using a silver cathode. Since no metal is being removed, a composite cathode in which aluminum is plated with silver has been found effective for weight and cost reduction. When silver is used as a cathode, the internal resistance is reduced, a more uniform current density results, plating of unwanted silver under static conditions is facilitated, and stable current levels can be maintained.

If no losses occur by cathodic deposition or other means within the cell, the concentration in the effluent is a function of the silver ion generation rate and the water flow rate, and the three are interrelated by the equation:

$$C = G/F$$

where:

$C$=concentration ($\mu$g./liter—p.p.b.)
$G$=generation rate ($\mu$g./min.)
$F$=water flow rate (liters/min.)

From Faraday's law, the generation rate can be expressed as a function of current:

$$G = 0.067i$$

where $i$=current ($\mu$a.).

The current, and consequently the generation rate, are constant so that the concentration in the effluent varies inversely with the flow rate. At an average flow of 10 cc. per minute and a desired concentration of 100 p.p.b., the required amperage can be readily calculated at 14.9 microamps. Under no-flow or static conditions, a limiting concentration will be reached in the cell where a deposition (or plating rate) equals the generating rate, so that the total quantity of silver in the water reaches an equilibrium level. Uniform concentrations and effective sterilization cannot be achieved in locations where rapid water surge exists if the surge volume exceeds the cell volume and no mixing or diffusion occurs downstream.

Actual amperage requirements will be greater than theoretical to overcome losses of silver ions within the cell by deposition on the cathode and within the system downstream of the cells by reduction or adsorption. The electrolytic silver ion generator is designed to insure that the even flow of water past the anode removes all ionic silver. Any "dead spots" in the cell will accumulate silver ions. The higher concentration rate in this region will increase the solution conductivity and direct the current and ionic flow away from the main flow stream. This condition becomes progressively worse as the silver-ion concentration increases. Operating efficiency is then reduced by preferred cathodic deposition.

A similar situation can exist if concentration gradients form in the flowing water. Water flow is considered to be laminar, so that no turbulence is available to dispense a gradient when it is formed. If the residence time in the cell is excessive, such gradients can result from changes in conductivity or water flowing past the anode, imperfections in the anode or cathode, or from the improper positioning of anode 56 in the true center of cathode 59. Since current densities are very small, the current seeks the path of least resistance and follows the concentration gradient down the anode until the water leaves the cell. This non-uniform current density heightens losses by cathodic deposition and causes the concentration in the effluent to fluctuate.

The silver ion concentration is greatest at the outlet, and maximum losses occur, due to cathodic plating, can be expected in this region. Cathodic plating at the outlet has been minimized by keeping the cathode length less than the anode length, and by drawing the water away from the cathode toward the anode as it leaves the cell. Overall cell losses are reduced by minimizing the cathodic area and the cell residence time.

Minor changes in silver ion concentration are not detrimental, and occur with fluctuations in water flow. Minor amperage variations will normally occur with changes in water conductivity within the cell. The maximum variation and current that can occur at any current level can be limited by determining the internal cell resistance at the desired current level using water of both high and low conductivity and making the variation in resistance a fixed fraction of the overall resistance. This determines the required external resistance from which the battery voltage can be calculated. Fluctuations in output concentrations, which can occur with changes in flow rate or pH, are then fixed.

Accordingly, the required circuitry reduces to a fixed control resistance of such magnitude that changes in internal resistance represent only a small fraction of the overall resistance, with battery 60 being of sufficient voltage to produce the required current. If anode 56 and cathode 59 become shorted internally by a stray metallic path, the cell 50 becomes inoperative. The amperage will rise to the maximum value fixed by resistor 61 and the voltage of battery 60.

Aluminum and silver form an electrolytic cell in which the silver becomes a positive electrode (anode). Thus, both silver electrodes, i.e., anode and cathode, must be electrically isolated from the aluminum system which is considered to be the ground, to prevent undesirable electric currents, corrosion, and plating-out of silver-ions. The use of silver-plated aluminum for a cathode is not detrimental if the silver coating is sufficiently thick so that no aluminum is exposed to the water (electrolyte).

To avoid complete electrical isolation of the cell, anode 56 is grounded through a high resistance (22 megohms) resistor 62. The current which would normally flow from the silver anode to the aluminum ground is effectively nulled by current flowing from battery 60 to anode 56. Corrosion of the aluminum portions of the cell is inhibited, but the aluminum is held slightly anodic and tends to repel deposition or reduction of the ionic silver produced at the anode. By placing another resistor 63 (22 megohms) (see FIG. 5) in parallel to an ammeter/switch connection 64, a trickle current of about 1.1 microamps always flows between the anode and the cathode, and the condition of zero current flow between the anode and ground is maintained even if the cell is essentially in an "off" status. The cathode is completely insulated by insulator 65 to avoid any contact with the ground.

Since a regulated small current drain may be required for extended periods of up to six months, the use of a battery with a very stable voltage output is required. One such battery is a silver-oxide battery (Union Carbide, Eveready No. 301, 100 ma.h., 4.5 v.). Such a battery, which is rated at 100 ma.h., will have a service life of more than one year under a continuous current drain of 10 microamps. Selecting control resistors 61 on the basis of nominal flow rates of 3 cc. per minute for the condensate and 7 cc. per minute for the fuel cell water, it was found that the value of resistor 61 should be 1 megohm and 360K ohms, respectively, to yield 85 to 90 p.p.b. of silver at the cell outlet.

Cathode 49 was fabricated from aluminum silver-plated to a depth of 0.001 inch. Anode 56 was formed from high purity silver (99.999% or better). Anode support 57 is designed to both center anode 56 and to provide the required water distribution. Tetrafluoroethylene may be utilized for the support material since it is nonconductive and can be readily machined. Wire connections to the anode, which are also within the water system, are similarly fabricated from high purity silver. Such connections are positioned upstream of cathode 59 so as to avoid any current flow between the thin electrical leads and the cathode which would result in deterioration of the lead and eventual cell failure. The wire connection may be insulated with tetrafluoroethylene. In the cell shown in FIG. 3, the anode and cathode have the following dimensions:

|  | Anode | Cathode |
| --- | --- | --- |
| Diameter, cm | 1.20 | 1.905 |
| Length, cm | 1.27 | 1.27 |
| Effective area (cm.²) | 4.79 | 7.60 |

The volume between them was approximately 3 cc.

The control circuit for the cell, which is formed of battery 60 and the resistors, may be incorporated into a unit which is located in the housing. The battery and circuit board containing the resistors may be potted. Terminals, in series with the current flow, provide for on-off functions or for measuring the current. These terminals are normally shorted with a shorting plug 66 when the cell is operating. Accordingly, each cell is in effect an integral unit which simplifies installation or replacement.

When installed, the electrolytic cells become part of the aluminum tubing system. The tubing has a very high area-to-volume ratio and losses by adsorption or by reduction on aluminum surfaces in a few feet of tube length can become excessive unless proper precautions are taken. It was discovered that if the tubes were filled with water and then sealed off, the water soak provided an excellent method of passivation. Throughout, efficiencies increased to 85%–95%, and silver-ion losses were negligible. The procedure appears equally applicable to aluminum tubes in an as-received condition, or to those treated with chromic solutions.

If the system is filled with water and sealed off for four to seven days, a pressure buildup will occur. This pressure rise occurs from the formation of hydrogen, probably from the reaction of aluminum with water. Once this reaction has occurred, the aluminum apparently loses the ability to reduce silver. In essence, the active sites are oxidized.

The system was tested to determine the bactericidal effects of the silver-ion produced by the electrolyte cell on cultures of *Escherichia coli* and *Staphylococcus aureus* in continuous flowing system shown in FIG. 1, and an essentially complete kill was observed within twenty-four hours.

Accordingly, it can be seen from the foregoing that a water management system has been provided which will provide effective bactericidal control in both the waste water system and the potable water system. The electrolytic cell is self-contained, requiring no external power or control system. It precisely meters silver-ions with the water flow stream, the desired concentration being adjusted on average flow. It is self-limiting if water ceases to flow. No maintenance is required, and the cell has a long life.

Although the embodiment of the electrolytic cell is particularly adapted for producing ions in a continuous flowing stream, such cells may be useful for medical applications where it could be constructed in the form of a needle which could be used to control the amount and rate of introduction or removal of trace elements (not only silver) in the bloodstream. Electrode substrates could be varied as desired. The amount of trace element to be introduced could be controlled by initially plating the desired quantity of the element onto the anode.

As many possible embodiments may be made of the invention without departing from the scope thereof, it is to be understood that all matter herein set forth or shown in the accompanying drawings is to be interpreted as illustrative and not in a limiting sense.

What is claimed and desired to be secured by Letters Patent is:

1. An electrolytic cell for producing ions into a substantially continuously flowing stream of fluid comprising:
   a housing having a chamber and an inlet and outlet communicating with said chamber;
   an anode located in and insulated from the chamber in the flow path of fluid through the housing;
   a cathode surrounding the anode in spaced relation;
   a source of direct current, the positive terminal of said direct current source connected to the anode, the negative terminal of said direct current source connected to the cathode; and
   a control resistor in the line between the positive terminal of the direct current source and the anode to limit the current to the anode.

2. The electrolytic cell specified in claim 1 wherein the anode is formed of silver and is positioned in a fitting formed of tetrafluoroethylene and the cathode is in the form of a cylinder with the anode centered with respect thereto, the surface of the cathode facing the anode being silver.

3. The electrolytic cell specified in claim 2 wherein the length of the cathode is less than the length of the anode and the outlet is located so that it draws fluid away from the cathode toward the anode as it leaves the cell.

4. The electrolytic cell specified in claim 1 wherein the direct current source is a battery having a stable voltage output and the resistor has a value to limit production of silver ions to 50 to 200 p.p.b. in a continuous flowing stream of fluid.

5. The electrolytic cell specified in claim 4 including a high electrical resistance between the anode and ground to prevent complete electrical isolation of the cell.

6. The electrolytic cell specified in claim 5 including the circuit having a switch and a second high electrical resistance which is in parallel with the switch, the resistance being of such value that a trickle current always flows between the anode and cathode, and the condition of zero current flow between the anode and ground is maintained even if the cell is essentially in an off status.

7. A silver ion generator for producing silver ions in a fluid system having a continuous flowing stream of water of relatively low conductivity to provide bacterial control, said generator comprising:
   a housing for connection with the fluid system, said housing having a flow chamber through which the water will flow;
   a silver anode in the flow chamber;
   a compatible cathode spaced from said anode;
   a source of direct current, the positive terminal of said direct current source connected to the anode and the negative terminal of said direct current source connected to the cathode; and
   a control resistor in the electrical circuit limiting the amount of current to the anode, the resistor being of such value that changes in internal resistance as reflected by the pH and flow rate of the water represent only a small fraction of the overall resistance and the voltage of the direct current source being such to produce the required current to maintain the production of silver ions between 50 and 100 p.p.b.

8. The silver ion generator set forth in claim 7 wherein the cathode is silver and the anode and cathode are electrically isolated from the fluid system to prevent undesirable electrical currents, corrosion, and plating out of silver ions.

9. The silver ion generator set forth in claim 8 wherein the body is formed of aluminum and the silver anode is grounded thereto through a high electrical resistance whereby current which would normally flow from the silver anode to the aluminum is effectively nulled by current flowing from the direct current source to the anode.

10. The silver ion generator set forth in claim 9 wherein an ammeter and/or switch is included in the electrical circuit and a second high electrical resistance is in parallel therewith whereby a trickle current always flows between the anode and cathode and the condition of zero current flow between the anode and the cathode is maintained even if the generator is essentially in an off status.

References Cited

UNITED STATES PATENTS

| | | | |
|---|---|---|---|
| 661,340 | 11/1900 | Grever | 204—149 |
| 2,299,964 | 10/1942 | Crouch | 204—149 |
| 2,490,730 | 12/1949 | Dubilier | 204—305 |

FOREIGN PATENTS

| | | | |
|---|---|---|---|
| 412,762 | 7/1934 | Great Britain | 204—137.5 |

OTHER REFERENCES

A.P.C. Application of Bojinescu et al.; Serial No. 335,549; Published May 18, 1943.

Branoes, "Something New in Water Sterilization," Beach & Pool Magazine, July 1934.

JOHN H. MACK, Primary Examiner

A. C. PRESCOTT, Assistant Examiner

U.S. Cl. X.R.
204—149, 272, 275